United States Patent [19]

Kishi et al.

[11] Patent Number: 5,394,512
[45] Date of Patent: Feb. 28, 1995

[54] KNOWLEDGE-BASE COMPUTER SYSTEM WITH STATE INFORMATION INDICATIVE OF AMBIGUOUS APPLIED CONDITIONS

[75] Inventors: Norimasa Kishi, Yokohama; Masaki Watanabe, Yokosuka, both of Japan

[73] Assignee: Nissan Motor Co., Ltd., Yokohama, Japan

[21] Appl. No.: 947,815

[22] Filed: Sep. 21, 1992

[30] Foreign Application Priority Data

Sep. 21, 1991 [JP] Japan .................. 3-270260

[51] Int. Cl.6 .................. G06F 9/00; G06F 15/60; G06F 15/74
[52] U.S. Cl. .................. 395/51
[58] Field of Search .................. 395/51

[56] References Cited

U.S. PATENT DOCUMENTS

| | | | |
|---|---|---|---|
| 4,815,005 | 3/1989 | Oyanagi | 395/51 |
| 4,908,778 | 3/1990 | Moriyasu | 395/51 |
| 4,918,620 | 4/1990 | Ulug | 395/51 |
| 4,959,799 | 9/1990 | Yoshiura | 395/51 |

*Primary Examiner*—Robert W. Downs
*Assistant Examiner*—Richemond Dorvil
*Attorney, Agent, or Firm*—Lowe, Price, LeBlanc & Becker

[57] ABSTRACT

A knowledge-base computer system includes an inference section which provides retrieval inference means, state information generating means and execution control means. The retrieval inference means retrieves frame knowledge relative to output information specified at an input section, and calculates output information value corresponding to the output information selected from a knowledge base section. The state information generating means executes the calculation of output information value corresponding the output information by each solution in each frame, and generates state information indicative of a state of the executed result of the calculation when the retrieval inference means searched information including a plurality of solution. The execution control means determines the execution of next solution in response to the state information on the basis of the execution control, method information. Therefore, the execution by this computer system is continued without stopping the execution even when a calculation impossibility is occurred.

6 Claims, 3 Drawing Sheets

KNOWLEDGE-BASE COMPUTER SYSTEM WITH STATE INFORMATION INDICATIVE OF AMBIGUOUS APPLIED CONDITIONS

BACKGROUND OF THE INVENTION

1. Field of the Invention

The present invention relates to improvements in a knowledge-base computer system which solves a problem of a design procedure or control procedure constituted by information including ambiguous applied conditions, or if-then rules.

2. Description of the Prior Art

A conventional knowledge-base computer system is generally arranged to flexibly execute a procedure by utilizing previously memorized procedure and solution for a design or control in the form of information unit such as a frame. Such a computer system includes an input section, an output section, an inference section and a knowledge base section. The computer system is designed to seek a value of output information by means of the object oriented method. That is, when output information to be outputted is requested in a frame knowledge, input information related to the output information is searched from the knowledge base section. Until the input information satisfies the condition for obtaining the output information, every input information is repeatingly obtained while a newly obtained and unsettled information is taken into consideration to be searched. Thus, the conventional knowledge-base computer system is designed such that the frame knowledge has to perfectly provide the applied condition for the output information. Accordingly, when the condition for judgement in a frame is not clear, the answer "its frame output information" can not be obtained.

SUMMARY OF THE INVENTION

It is an object of the present invention to provide an improved knowledge-base computer system which outputs the executed result even if a frame including an ambiguous applied condition is stored in the knowledge base section.

A knowledge-base computer system according to the present invention comprises an input section through which data and information relative to output information is requested and inputted. An knowledge base section stores frame knowledge which includes a plurality of knowledge groups, that is, output information, data and input information related to the output information, their relationships and execution control method information. An inference section includes retrieval inference means, state information generating means and execution control means. The retrieval inference means retrieves a frame knowledge for the output information from said knowledge base section, on the basis of the information from said input section, and calculates output information value corresponding the information selected from the knowledge base section. The state information generating means iteratively executes the calculation of output information value corresponding every relationships for every searched frame and generates state information indicative of a state of the executed result of the calculation when the retrieval inference means searches a plurality of frames for the output information. The execution control means determines the execution of next-solution in response to the state information on the basis of the execution control method information. An output section outputs the result of the calculation in said inference section.

With this arrangement, even if the calculation impossibility is occurred, the operation is not stopped and the state information is outputted. Therefore, even when ambiguous information concerning the applied condition is stored in the knowledge base, it is easy to know whether output information value by every applied condition has been obtained, or the calculation has been impossible, or the calculation has not been executed.

DETAILED DESCRIPTION OF THE INVENTION

Figure 1:
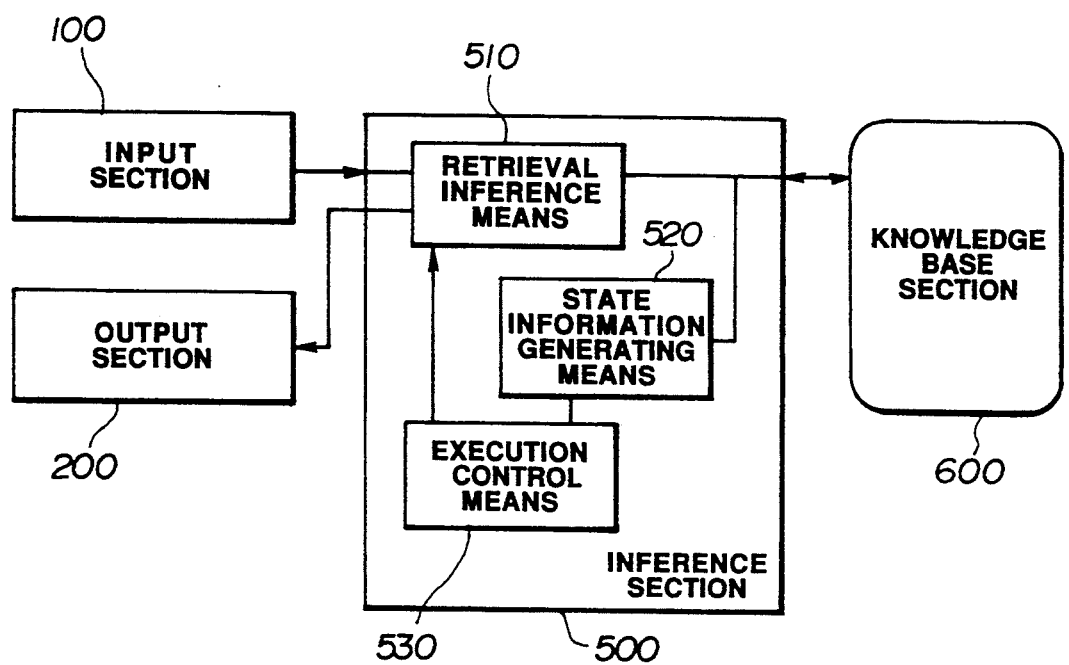
FIG. 1 is a block diagram showing an embodiment of a knowledge base computer system according to the present invention.
Figure 2:
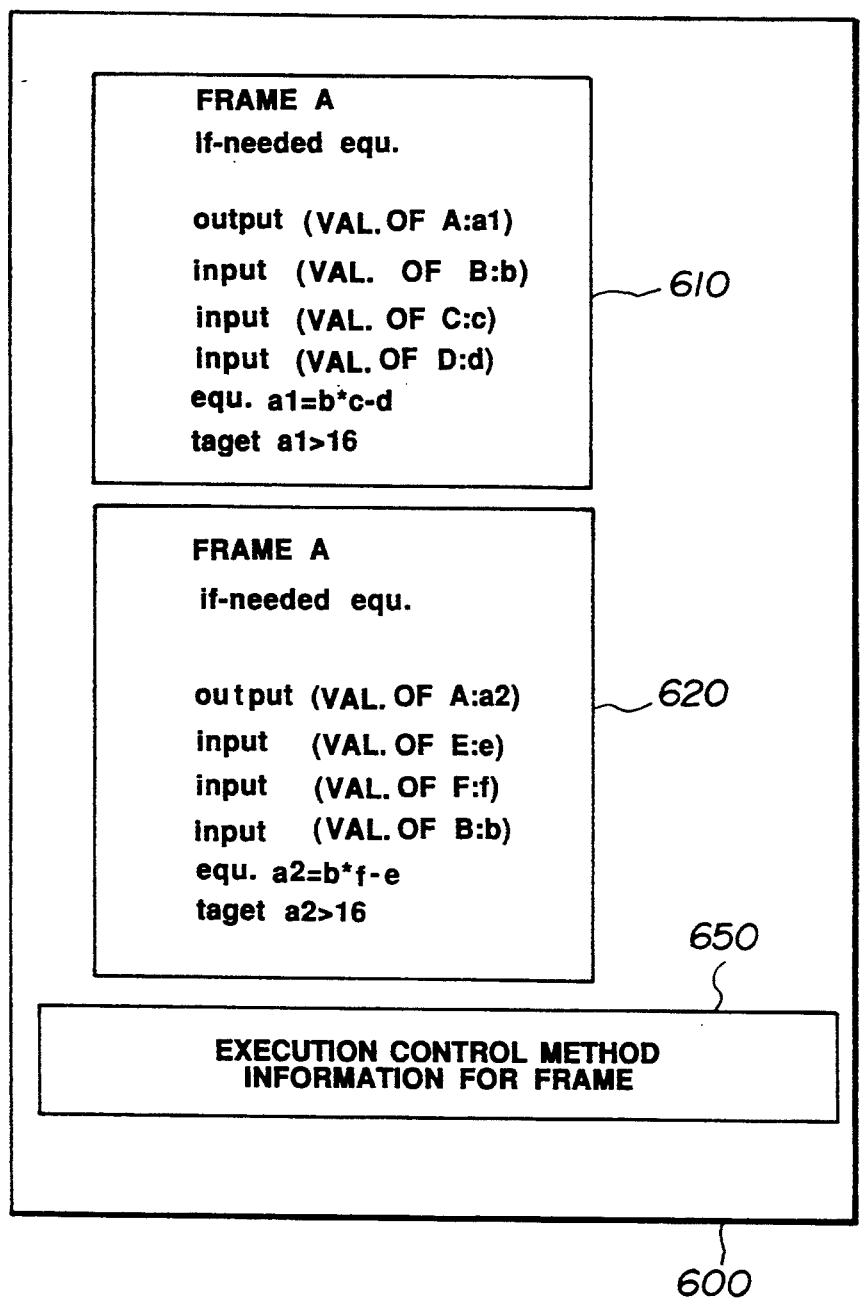
FIG. 2 is an example of a content of a knowledge base of FIG. 1.
Figure 3:
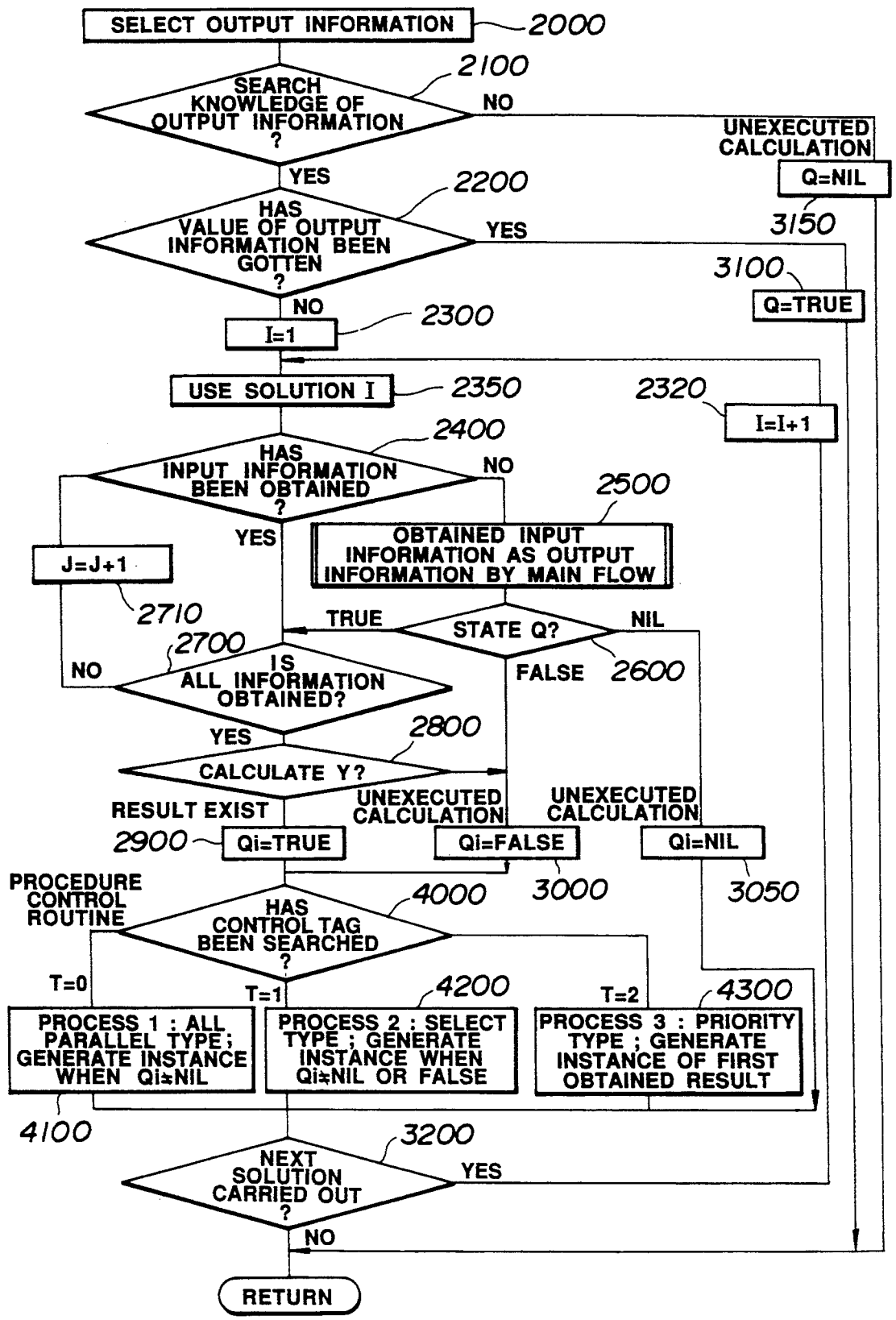
FIG. 3 is a flow chart which shows an execution of inference in an inference section.

Referring to FIGS. 1 to 3, there is shown an embodiment of a knowledge-base computer system according to the present invention.

As shown in FIG. 1, the knowledge-base computer system comprises an inference section 500 which includes a retrieval inference means 510, a state-information generating means 520 and an execution control means 530. The inference section 500 is connected to an input section 100 through which the input of data and output information is inputted and requested. An output section 200 for displaying a result and a procedure process is connected to the inference section 500.

A knowledge base section 600 includes a plurality of frame knowledge 610, 620, . . . and execution control method information 650, . . . . Each of the frame knowledge 610, 620, . . . has an obtaining procedure which includes data such as B, C, D and relational equations necessary for output information A, requested to be outputted along with standard and its related information. Such information is memorized as a hierarchical information representation. When the information A is treated as output information, the data B, C, D are called input information. Additionally, when the values of the respective data B, C, D are obtained, the data B, C, D are treated as output information. When a plurality of frames are applicable to a certain predetermined information, a plurality of solutions exist.

In the inference section 500, an inference processing section 510 is carried out according to a flow-chart shown in FIG. 3 in order to seek the value of the specified output information requested on the basis of the information of the input section 100 and the output section 200. In a step 2000, output information to be displayed on the output section 200 is determined on the basis of the information from the input and output section 100 and 200. In a step 2100, information relating to the output information is searched and looked-up by the inference section 510 from the knowledge base 600. If no looked-up information exists in this search, the routine proceeds to a step 3150 wherein it is judged that the output information can not be obtained and Q=NIL is outputted by the state-information generating means 520. Further, it will be understood that the information, such, as that the output information can not be obtained, may be outputted into the output section 200 and may be inputted from the input section 100.

When some looked-up information exists it is judged at a step 2200 whether the value of the output information has been obtained or not. For example, in the embodiment shown in FIG. 2 the value of the output A corresponds to a1 and a2. When in the step 2200 the value of the output A has been already obtained, the routine proceeds to a step 3100 wherein the obtained value is treated as a result and "Q=TRUE" is outputted as state information that indicates the completion of calculation processing. When in the step 2200 the value of the output A has not been obtained, the routine proceeds to a step 2300 wherein it is determined that the information is obtained by means of a solving method in the 1st frame. Following this, in a step 2350 the output information is obtained by means of the way of solution in the 1st frame.

In a step 2400, it is judged whether the input information for the output information has been searched or not. The values b, c, d of the respective output information B, C, D in the 1st frame are searched in the order of the output information B, C, D, in this embodiment. That is to say, first it is judged whether the value of the input information B has been obtained or not. If the value of the input information B has already been obtained, the routine proceeds to a step 2700. If not, the routine proceeds to a step 2500.

In the step 2500, unsettled input information is treated as a new output information and the value of the unsettled input information is obtained recursively by the same main flow. That is to say, since every information is memorized as a hierarchical knowledge representation, even if the input information B is unsettled, a necessary knowledge for outputting the information B as output information can be looked-up and the same routine flow can be carried out. In a step 2600, it is judged what state information Q results. When the value of the input information is obtained, let Q be TRUE and the routine proceeds to the step 2700. When the value of the input information can not be obtained, let Q be FALSE and the routine proceeds to a step 3000. When the value of the input information has not yet been obtained (the operation has not yet been carried out), the routine proceeds to a step 3050 wherein the state information Q is set to NIL (Q=NIL).

In the step 2700, it is judged whether all input information for the output information has been obtained or not. When the judgment in the step 2700 is "NO", the routine proceeds to a step 2710 wherein J is replaced by J+1 (J=J+1). Following this, the routine returns to the step 2400. After the value of the input data B was obtained by these operations, the value of the input data C proceeds to be obtained. When all input information have been obtained, that is, when the judgment in the step 2700 is "YES", the routine proceeds to a step 2800 wherein the calculation equation is carried out. In this embodiment, the calculation of the equation a=b*c-d in the 1st frame is carried out.

That is to say, retrieval inference means is constituted by the steps 2100 to 2800. During the calculation operation 2800, since various incomputations, such as, an overflow and a calculation impossibility such as a division by 0 or incoherence of argument are generally occurred, a conventional system generally stops the calculation operation. However, in this embodiment of the knowledge-base computer system according to the present invention, in the step 2800, the incomputational information detectable in the calculation system is treated as a part of the calculated result, and the routine proceeds to next step without stopping the operation. That is to say, when the calculated result exists, the routine proceeds to a step 2900 wherein the state information Q is set to TRUE. Following this, the routine proceeds to a step 4000 wherein the control tag T is searched where T is execution control method information. When the output information can not be obtained at the step 2800, the routine proceeds to a step 3000 wherein the state information Q is set to FALSE. Following this, the routine proceeds to the step 4000. The program is arranged such that the control tag T takes 0, 1 or 2. When the control tag T takes 0 (T=0), all calculation results are continued and in a step 4100 every obtained result and the state information Q are outputted as an answer. When the control tag T takes 1 (T=1), the routine proceeds to a step 4200 wherein the calculations are continued in only case that the result is obtained. When the control tag T takes 2 (T=2), the routine proceeds to a step 4300 wherein the output operation is carried out only when first result is obtained and in the other case the output operation is not carried out. It will be understood that the execution control method of the processing may be determined on the basis of the priority order in a plurality of frames or on the basis of their evaluation function.

On the basis of the information of the execution control method, it is judged in a step 3200 whether the next solution is continued or not. When the execution is continued, the routine proceeds to a step 2320 wherein I is replaced by I+1 (I=I+1), and the routine returns to the step 2350 wherein the information is obtained by means of the way of solution in 2nd frame. With this operation, the execution for the information including new input information such as E and F in the 2nd frame is carried out. When next execution is judged to stop, at the step 3200 the calculated result and the state information Q are outputted as output information. Steps 4000, 4100, 4200, 4300 and 3200 constitute an execution control means.

Since in the inference section 500 the execution is proceeded according to the flow chart of FIG. 3, even if the conditional expression is constituted by a plurality of solutions which has ambiguous applied condition, the result can be obtained. When the calculation is impossible to be carried out, its incomputation information is informed by the state information Q or Qi. Accordingly, by adding a normal trace function, it becomes easy to specify the position where the calculation can not be obtained. Furthermore, such information is useful to clarify the applied conditional definition of the solution.

With the thus arranged computer system, during the data value calculation of output information, when information including a plurality of solutions is obtained, the data value calculation to every solution is executed in turn and state information representing an executed result condition is outputted. Furthermore, the information includes execution control method information. Therefore, the execution of the next solution is determined according to the determination by the execution control method information and according to the state of the execution result. Accordingly, even if the calculation impossibility is occurred, the operation is not stepped and the state information is outputted. Therefore, even when ambiguous information relative to the applied condition for the solution written in a frame is stored in the knowledge base, it is easy to know whether the data value by every solution has been obtained, or the calculation has been impossible, or the calculation has not been executed.

What is claimed is:

1. A knowledge-base computer system comprising:
an input section for inputting data and requesting information relative to outputted information;
a knowledge base section for storing frame knowledge which includes a plurality of knowledge groups and execution control method information;
an inference section including:
retrieval inference means for retrieving a frame knowledge for the output information from said knowledge base section, on the basis of the requested information from said input section, and calculating a value of output information corresponding to information selected from the knowledge base section;
state information generating means for executing a calculation of a value of output information corresponding to every relationship for every applied condition and generating state information indicative of a state of a result of the executed calculation in turn when the retrieval inference means searches information including a plurality of applied conditions;
execution control means for determining an execution of a next applied condition for solution in response to the state information on the basis of the execution control method information;
an output section for outputting the result of the executed calculation in said inference section, wherein the state information generating means comprises means for generating state information indicative of impossibility of further calculation in a frame,
said execution control means responsive to said information of impossibility of further calculation by continuing a further calculation in a next frame for input information capable of further calculation.

2. A knowledge-base computer system as claimed in claim 1, wherein said knowledge base section comprises output information and data necessary to obtain the value of the output information.

3. A knowledge-base computer system as claimed in claim 1, wherein when no information is searched from said knowledge base section, information indicative of existence of no information relative to the output information is outputted from said output section and inputted from said input section.

4. A knowledge-base computer system comprising:
an input section for inputting data and requesting information relative to outputted information;
a knowledge base section for storing frame knowledge which includes a plurality of knowledge groups and execution control method information;
an inference section including:
retrieval inference means for retrieving a frame knowledge for the output information from said knowledge base section, on the basis of the requested information from said input section, and calculating a value of output information corresponding to information selected from the knowledge base section;
state information generating means for executing a calculation of a value of output information corresponding to every relationship for every applied condition and generating state information indicative of a state of a result of the executed calculation in turn when the retrieval inference means searches information including a plurality of applied conditions;
execution control means for determining an execution of a next applied condition for solution in response to the state information on the basis of the execution control method information;
an output section for outputting the result of the executed calculation in said inference section, wherein the state information generating means selectively generates a first state information which indicates that the value of the requested information was obtained, a second state information which indicates that the execution of the calculation is impossible, and a third state information which indicates the execution of the calculation has not yet been carried out.

5. A knowledge-base computer system comprising:
an input section for inputting data and requesting information relative to outputted information;
a knowledge base section for storing frame knowledge which includes a plurality of knowledge groups and execution control method information;
an inference section including:
retrieval inference means for retrieving a frame knowledge for the output information from said knowledge base section, on the basis of the requested information from said input section, and calculating a value of output information corresponding to information selected from the knowledge base section;
state information generating means for executing a calculation of a value of output information corresponding to every relationship for every applied condition and generating state information indicative of a state of a result of the executed calculation in turn when the retrieval inference means searches information including a plurality of applied conditions;
execution control means for determining an execution of a next applied condition for solution in response to the state information on the basis of the execution control method information;
an output section for outputting the result of the executed calculation in said inference section, wherein the execution control means selects one of a first execution in which all calculations are continued and the result of the executed calculations is outputted as an answer, a second execution in which the calculations are continued only when a result is obtained, and a third execution in which an output operation is carried out only when first result is obtained and otherwise the output operation is not carried out.

6. A knowledge-base computer system comprising:
an input section for inputting data and requesting information relative to outputted information;
a knowledge base section for storing frame knowledge which includes a plurality of knowledge groups and execution control method information;
an inference section including:
retrieval inference means for retrieving a frame knowledge for the output information from said knowledge base section, on the basis of the requested information from said input section, and calculating a value of output information corresponding to information selected from the knowledge base section;

state information generating means for executing a calculation of a value of output information corresponding to every relationship for every applied condition and generating state information indicative of a state of a result of the executed calculation in turn when the retrieval inference means searches information including a plurality of applied conditions;

execution control means for determining an execution of a next applied condition for solution in response to the state information on the basis of the execution control method information;

an output section for outputting the result of the executed calculation in said inference section, wherein the state information generating means comprises means for generating state information indicative of ambiguous applied conditions in a frame, said execution control means responsive to said information of ambiguous applied conditions by continuing a further calculation in a next frame for input information capable of further calculation.

* * * * *